Oct. 13, 1925.
N. R. NELSON
DRAFT DEVICE
Filed March 8, 1920     2 Sheets-Sheet 2
1,557,187
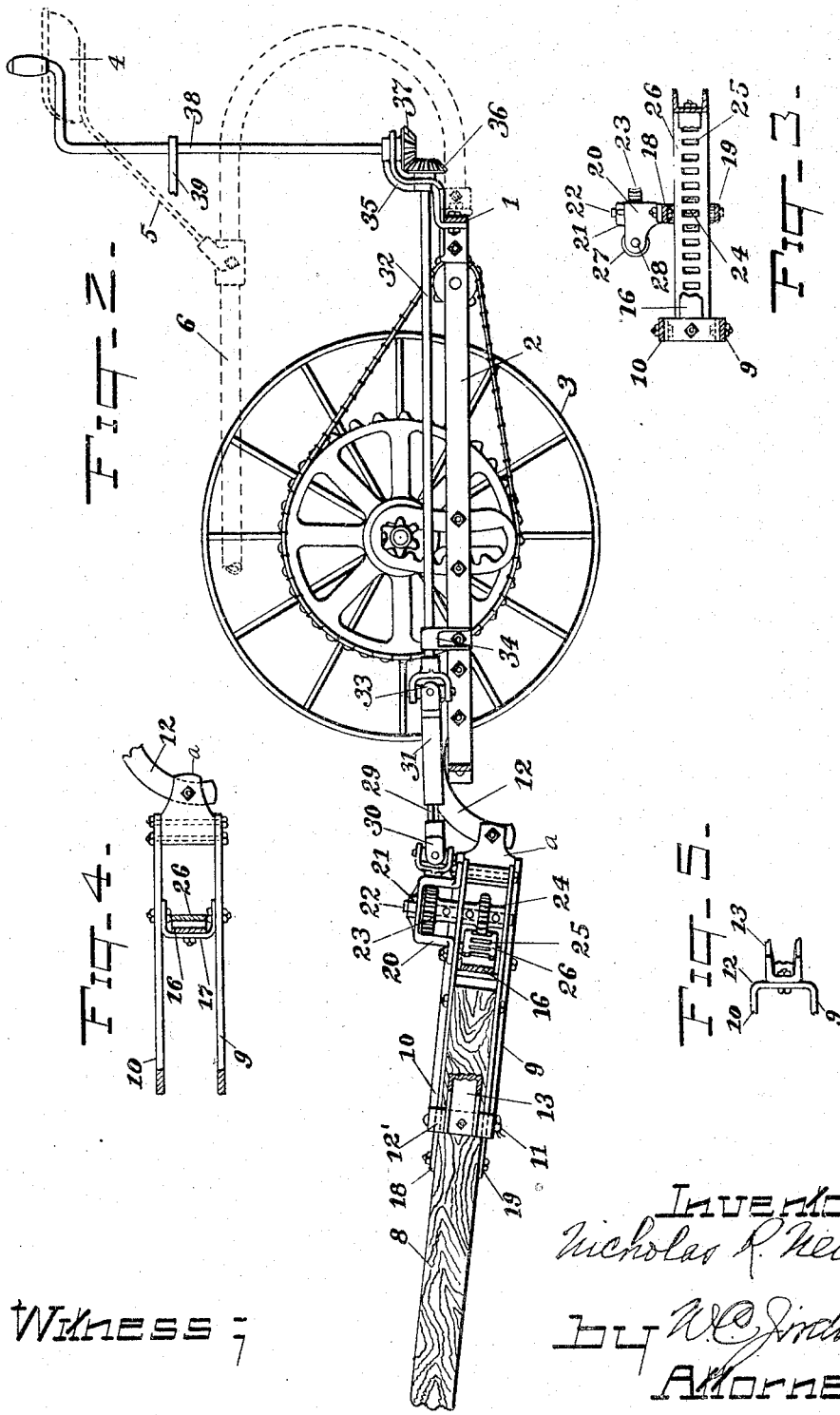

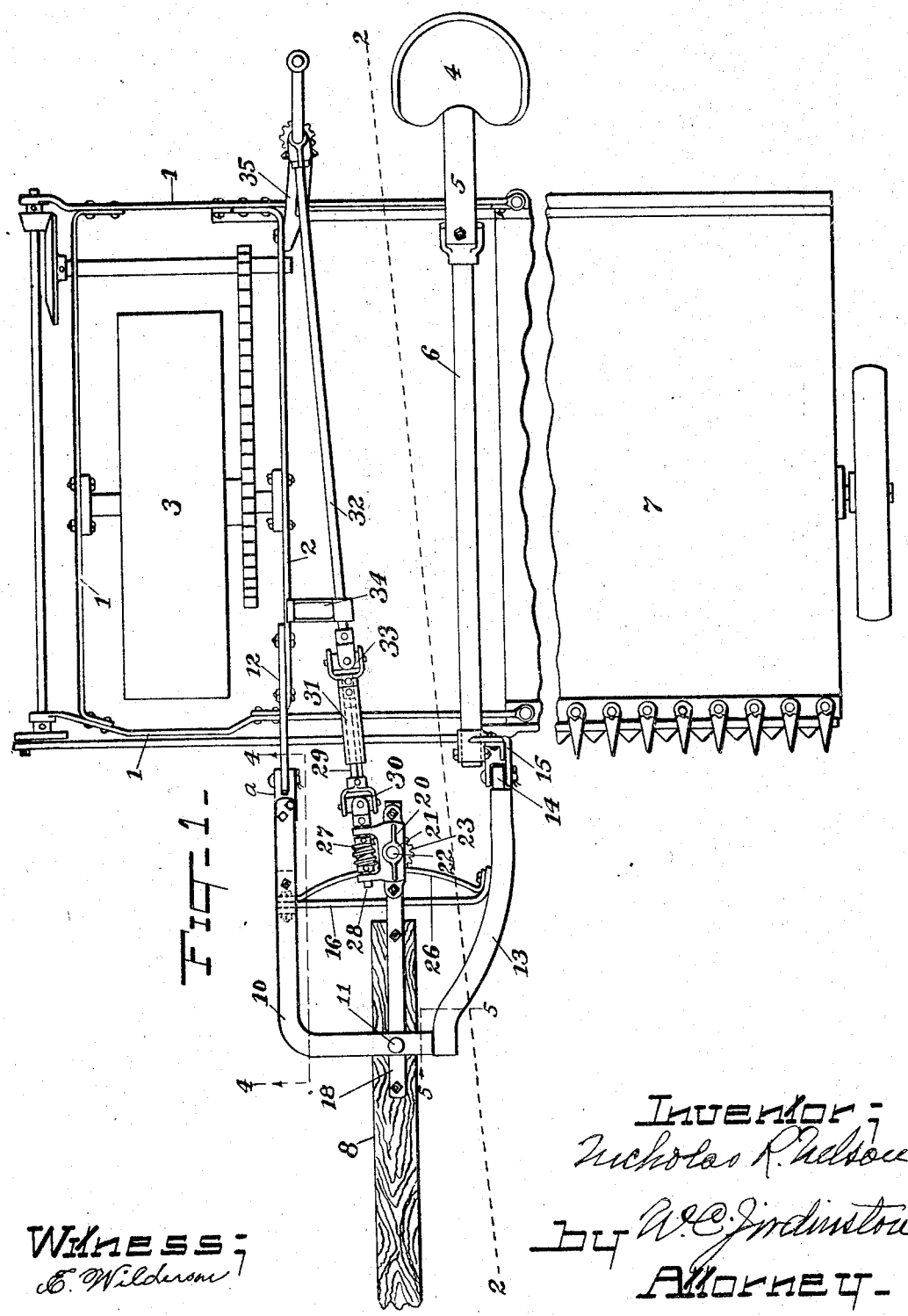

Patented Oct. 13, 1925.

1,557,187

UNITED STATES PATENT OFFICE.

NICHOLAS R. NELSON, OF EAST MOLINE, ILLINOIS, ASSIGNOR TO DEERE & COMPANY, OF MOLINE, ILLINOIS, A CORPORATION OF ILLINOIS.

DRAFT DEVICE.

Application filed March 8, 1920. Serial No. 363,934.

*To all whom it may concern:*

Be it known that I, NICHOLAS R. NELSON, a citizen of the United States, residing at East Moline, in the county of Rock Island and State of Illinois, have invented certain new and useful Improvements in Draft Devices, of which the following is a specification, reference being had therein to the accompanying drawing.

My invention relates to draft devices more especially adapted for use on agricultural machines, and has for its object the production of a steering mechanism which is readily controlled by the driver of a machine to which my device is attached, and which is particularly desirable when such machines are drawn by a tractor, as will be fully disclosed in the following specification.

Referring to the drawings in which similar numerals indicate identical parts—

Figure 1 is a plan view of my device attached to a harvester, sufficient of the latter being shown to illustrate the application of my invention.

Figure 2 is a side elevation of Figure 1 in part section on the line 2—2.

Figure 3 is a detail of part of the steering mechanism.

Figure 4 is a section on the line 4—4 of Figure 1, and

Figure 5 is a detail of a draft frame joint.

The part of the harvester shown includes a frame 1, a cross bar 2, a bull wheel 3, a seat 4 mounted on a seat spring 5 secured to a common type of seat bar 6, and a part of a harvester platform 7. A draft pole or tongue 8 is pivotally supported, forward of its rear end on a draft frame which includes parallel bars 9 and 10, one above the other, secured to a casting *a* which is pivotally supported by a horizontal pivot on a bracket bolted to the cross bar 2. The bars 9 and 10 extend forwardly for part of their length and are then bent grainward at substantially a right angle passing one over and the other beneath the pole 8 which is pivotally supported therebetween by a vertical pivot 11. For economy of construction I have made each of the two bars of a single piece bent to form transverse bars 12, which are rigidly connected to the grainward member of the draft frame, the latter consisting of a channel bar 13 the rear end of which is secured to a casting 14 pivotally supported by a horizontal pivot on a bracket 15 on the frame 1. The draft frame bars, as secured together, form a substantially rectangular structure pivotally supported on opposite sides of the medial line of the tongue 8.

A transverse brace 16, adding rigidity to the draft frame is bolted to the channel bar 13 and to a strut 17 between the bars 9 and 10. Bolted on the upper side of the tongue 8 and extending rearwardly therefrom is a bar 18, and a similar bar 19 is secured on the under side. A casting 20 is securely mounted on the bar 18 and journaled in a bearing 21 thereon is a vertical shaft 22 which is also supported in suitable openings in the bars 18 and 19. A worm gear 23 is secured on the shaft 22 between the bearing 21 and the bar 18; a pinion 24 is also secured on the shaft 22 between the bars 18 and 19 and meshes with notches 25 in an arcuate member 26 bolted to the transverse bar 16 and concentric with the pivot 11.

A worm 27 meshes with the worm gear 23 and is fixed on a shaft 28 journaled in suitable bearings on the casting 20. The shaft 28 is connected to a shaft 29 by a universal coupling 30. The shaft 29 is rectangular in cross section and telescopically operates with a sleeve 31 which is connected to a shaft 32 by a universal coupling 33. The shaft 32 is journaled in a bearing preferably integral with a bracket 34 mounted on the transverse bar 2; the rear of the shaft 32 is journaled in a bracket 35 mounted on the rear of the harvester frame and carries, secured on its rear extremity, a bevel pinion 36 meshing with a similar pinion 37 secured on a vertical shaft 38 supported by the bracket 35, and a bracket 39 which may be attached to an adjacent part of the harvester. The upper end of the vertical shaft 38 is cranked for manual operation of the mechanism described, and it is clearly evident that when the shaft 38 is rotated a similar movement is imparted to the shafts 32, 29 and 28 to rotate the worm 27 and the worm gear 23 in mesh therewith, so that the pinion 24 is simultaneously operated to swing the tongue 8 laterally on its pivot 11 to either side of the line of draft to steer the machine, by the engagement of the pinion 24 with the notches 25 in the arcuate member 26.

As stated the tongue 8 is pivotally supported forward of its rear end on a draft frame pivotally mounted on the frame of a machine. I find that by locating the pivotal point of the tongue 8 forward of its rear end is a decided advantage in that the tongue is quicker to respond to the action of the mechanism employed to swing it, and I also find that by constructing the draft frame with its points of support on opposite sides of the medial line of the tongue, the draft frame is capable of withstanding any strain to which it may be subjected; and while I have shown the draft frame substantially rectangular I do not so limit myself to that form, for other forms may be employed without departing from the spirit of my invention.

What I claim is—

1. A draft device for agricultural machines, having in combination a draft frame pivotally connected to the machine, a draft tongue pivotally supported intermediate its ends on said frame and extending rearwardly therein from its pivot, an arcuate member rigidly supported on both sides of said frame and concentric with the pivot of the tongue, a series of notches in said member, gearing mounted on the rear end of the tongue engaging with said notches, and means supported on the machine frame flexibly connected with said gearing and operable to actuate said gearing whereby the tongue is swung to either side of the normal line of draft.

2. A draft device for agricultural machines, having in combination a draft frame pivotally connected to the machine, a draft tongue pivotally supported intermediate its ends on the frame and extending rearwardly therein from its pivot, and adapted to be swung laterally in either direction to steer the machine, an arcuate member rigidly secured to the sides of said frame concentric with the pivot of the tongue, a series of notches in said member, gearing mounted on the rear end of the tongue movable therewith and engaging with said notches and cooperating therewith to swing the tongue, and means supported on the machine frame flexibly connected with said gearing and operable to actuate said gearing to swing said tongue laterally to either side of the normal line of draft.

NICHOLAS R. NELSON.